E. C. OLIVER.
RESETTING DEVICE.
APPLICATION FILED JUNE 20, 1910.
1,046,633.
Patented Dec. 10, 1912.
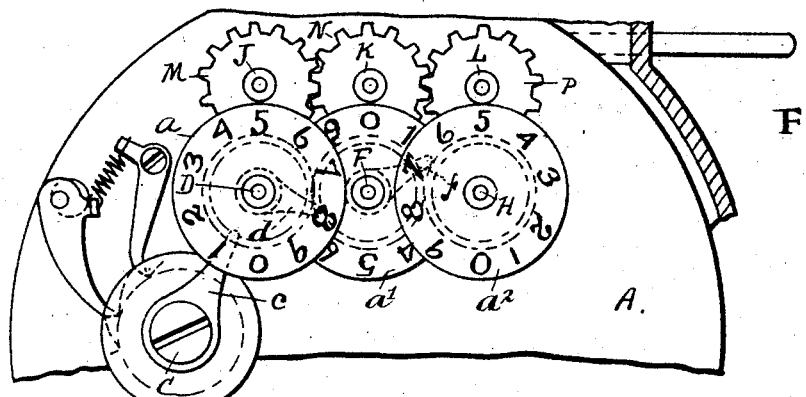
Fig. 1.
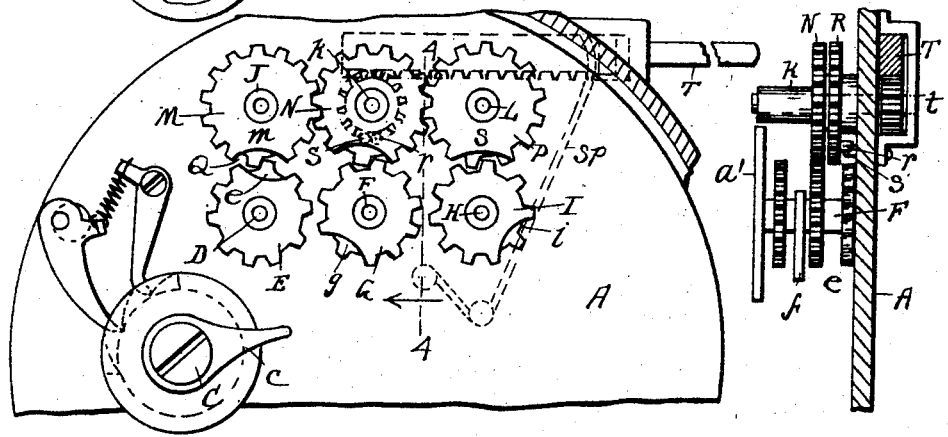
Fig. 2.
Fig. 4.
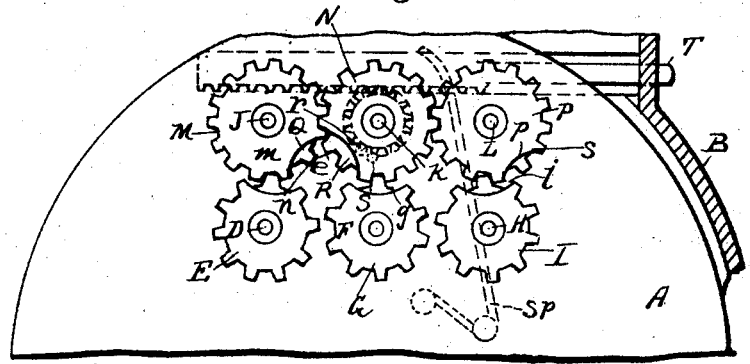
Fig. 3.
Witnesses
O. B. Baenziger
Vera Pillman
Inventor
Edd C. Oliver
By Parker & Burton
Attorneys

UNITED STATES PATENT OFFICE.

EDD C. OLIVER, OF DETROIT, MICHIGAN.

RESETTING DEVICE.

1,046,633.  Specification of Letters Patent.  Patented Dec. 10, 1912.

Application filed June 20, 1910. Serial No. 567,745.

*To all whom it may concern:*

Be it known that I, EDD C. OLIVER, a citizen of the United States, residing at Detroit, county of Wayne, State of Michigan, have invented a certain new and useful Improvement in Resetting Devices, and declare the following to be a full, clear, and exact description of the same, such as will enable others skilled in the art to which it pertains to make and use the same, reference being had to the accompanying drawings, which form a part of this specification.

My invention relates to a re-setting device for mechanical counters, and consists in the improvements hereinafter described and pointed out in the claim.

In the accompanying drawings:—Figure 1, is a plan view of so much of a mechanical re-setting device as is necessary to illustrate my invention. Fig. 2, is a view similar to Fig. 1, the indicating disks being removed and some of the wheels being shown in a different position from that indicated in Fig. 1. Fig. 3, is a view similar to Fig. 2, the portion of the casing shown being here indicated in section and the wheels shown in a different position from Figs. 1 and 2. Fig. 4, is a detail sectional view, the section being taken on the line 4—4 of Fig. 2, and the view being from the right of the sectional plan.

A, is the supporting plate which is inclosed in a casing B, only a small portion of the casing being shown.

C, is a spindle, the revolutions of which are to be counted.

D, F, H, are sleeves adapted to turn on pintles extending vertically from the supporting plate A. The sleeve D is actuated by the pointer $c$ upon the shaft C; the sleeve F by a pointer $d$ on the sleeve D, and the sleeve H by a pointer $f$ on the sleeve F in the usual way.

$a$, is an indicating disk on the sleeve D which is the units counter.

$a^1$, is an indicating disk upon the sleeve F which is the tens counter, and $a^2$, an indicating disk upon the sleeve H which is the hundreds counter.

My device is designed as an indicator of the distance traveled by an automobile and when one has gone upon a journey and returned, he wishes to know how far he has been which is recorded by the mechanical counter, then he wishes to restore the indexes to zero in order that they shall indicate directly the distance he has traveled on any subsequent journey. To this end, I place pinions E, G, I, upon the sleeves D, F, H, respectively, and I cut away a portion of each of these pinions, as indicated at $e$, $g$, $i$, at such a point in each of the pinions that all the cut away portions may be in line, as indicated in Fig. 3. I then provide a series of connected gear wheels M, N, P, secured upon sleeves J, K, L, which turn upon pintles extending vertically from the supporting plate A and so located that one of said wheels shall intermesh with one of the pinions E, G, I, except when the cut away portions of the latter are adjacent to the wheels M, N, P, as indicated in Fig. 3. I cut away a portion of each of the wheels M, N, P, as indicated at $m$, $n$, $p$, so that when said cut away portions are adjacent to the pinions E, G, I, the teeth of the gear wheels M, N, P, do not engage the teeth of said pinions. This position is indicated in Fig. 2.

Q, R, S, are gear wheels on the sleeves J, K, L, the teeth of the gear wheels Q, R, S, engage with each other and said gear wheels are continuous and not cut away as are the gear wheels previously described.

T, is a push rod having a rack upon a portion of it. The push rod T is adapted to reciprocate in bearings in the casing B and on the supporting plate A so that said push rod extends through the casing and may be actuated from the outside thereof.

$Sp$, is a retracting spring adapted to actuate the push rod T toward the right, as shown in the drawing.

$t$, is a gear wheel connected with the sleeve K so that the rotation of said gear wheels shall rotate said sleeve. The rack of the push rod T engages the teeth of the gear wheel $t$.

The operation of the above described device is as follows:—When the rod T is in its normal position, as shown in Fig. 2, it is forced to the limit of its travel to the right, as indicated, in which position it has actuated the gear wheels M, N, P, to the position shown so that the cut away portions of said gear wheels are adjacent to the pinions E, G, I, and therefore the latter wheels are free to turn independent of the former. Now if the apparatus is actuated and has registered a certain number of revolutions of the shaft C, the pinions E, G, and I will be—in some corresponding position, as for instance, that indicated in Fig. 2. Now, if it is desired to re-set the mechanism, the push rod T is pressed inward to the left to the limit of its travel, as shown in Fig. 3, by which motion all three of the gear wheels M, N, P, will be rotated, and each of said gear wheels will engage with its corresponding pinion in the series E, G, I, and turn the latter until the cut away portions $e$, $g$, $i$, come adjacent to the wheels M, N, P, as shown. Now when the push rod is released, it will be retracted by the spring Sp, the gear wheels M, N, P, turning freely to the position indicated in Fig. 2, in which the cut away portions are adjacent to the pinions E, G, I, and the latter are now free to turn independent of the wheels M, N, P. The positions of the pinions E, G, I, shown in Fig. 3, correspond to the zero indicating positions of the plates $a$, $a^1$, $a^2$, (Fig. 1).

$s$, is a lug rising from the supporting frame A, and $r$, is a lug extending inward from the gear wheel R on the sleeve K. The lug $r$ engages the lug $s$ to limit the rotation of the wheel N at the position shown in Fig. 2.

What I claim is:—

A series of revoluble indicating parts, each proceeding part being adapted to actuate the next following part, a portion of a revolution in the opposite angular direction each time the proceeding part revolves, each gear wheel having a portion of its circumference cut away, a second series of gear wheels intermeshing with each other each of the same having a portion of its circumference cut away, each of the second series of gear wheels adapted to engage a gear wheel on one of said indicating parts so as to impart to the same its proper movement relative to the other indicating parts, the cut away portions of said gear wheels having the relative location described, said second series of gear wheels being adapted to be actuated to restore the indicating parts to position.

In testimony whereof, I sign this specification in the presence of two witnesses.

EDD C. OLIVER.

Witnesses:
VIRGINIA C. SPRATT,
ELLIOTT J. STODDARD.